United States Patent [19]
Blankenship

[11] Patent Number: 5,516,453
[45] Date of Patent: May 14, 1996

[54] STABLE AMBIENT-CURING COMPOSITION

[75] Inventor: Robert M. Blankenship, Harleysville, Pa.

[73] Assignee: Rohm and Haas Company, Philadelphia, Pa.

[21] Appl. No.: 19,734

[22] Filed: Feb. 19, 1993

[51] Int. Cl.$^6$ .................................................. C09K 3/00
[52] U.S. Cl. ........................................................ 252/183.11
[58] Field of Search ........................................ 252/183.11

[56] References Cited

U.S. PATENT DOCUMENTS

| | | | |
|---|---|---|---|
| 3,956,357 | 5/1976 | Kaye et al. | 558/372 |
| 4,054,232 | 10/1977 | Cawley | 222/107 |
| 4,210,565 | 7/1980 | Emmons | 524/560 |
| 4,303,563 | 12/1981 | Emmons et al. | 525/257 |
| 4,318,848 | 3/1982 | Mölls et al. | 534/581 |
| 4,906,684 | 3/1990 | Say | 524/548 |
| 4,960,924 | 10/1990 | Bors et al. | 560/178 |
| 5,025,061 | 6/1991 | Ishidoya et al. | 524/539 |
| 5,202,364 | 4/1993 | Taniguchi et al. | 523/403 |
| 5,268,417 | 12/1993 | Filges et al. | 524/714 |
| 5,300,585 | 4/1994 | Wideman et al. | 525/332.7 |
| 5,349,026 | 9/1994 | Emmons et al. | 525/328 |

Primary Examiner—Edward A. Miller
Attorney, Agent, or Firm—Ronald D. Bakule

[57] ABSTRACT

A method for preparing a stable ambient-curing composition containing an active methylene-functional compound and an active methylene-reactive component is provided. A first component bearing at least two active methylene-functional groups is prepared and adjusted to a pH higher than about 7 with a permanent base, after which the pH of the first component is adjusted to a pH lower than about 4 with a volatile acid. Finally an active methylene-reactive component is admixed with the pH-adjusted first component at certain ratios to provide the stable ambient-curing composition.

6 Claims, No Drawings

STABLE AMBIENT-CURING COMPOSITION

FIELD OF THE INVENTION

This invention relates to a method for preparing a stable ambient-curing composition containing an active methylene-functional component and an active methylene-reactive component.

BACKGROUND OF THE INVENTION

The invention relates to a method for stabilizing mixtures of a component bearing at least two active methylene-functional groups and an active methylene-reactive component. More particularly, this invention relates to a method for preparing a one-pack-stable ambient-curing system which includes a first component bearing at least two active methylene-functional groups and a second component adapted to react with the active methylene-functional component. In a preferred embodiment this invention relates to method for preparing a one-pack-stable ambient-curing aqueous dispersion which includes a polymer bearing at least two active methylene-functional groups such as, for example, an addition polymer incorporating acetoacetoxyethyl methacrylate and an active methylene-reactive component such as, for example, an aldehyde.

The problem faced by the inventor is that the mixture of a component bearing at least two active methylene-functional groups and an active methylene-reactive component may yield a useful cured polymeric product but, as the mixture is inherently reactive and, thereby, unstable, it must be prepared just before the application of the mixture. The method of this invention provides an admixture which is stable as a one-pack system; but the method of this invention does not limit the desired reactivity of the components when the mixture is used.

DETAILED DESCRIPTION OF THE INVENTION

This invention relates to a method for preparing a stable ambient-curing composition by forming a first component bearing at least two active methylene-functional groups; adjusting the pH of the first component to a pH higher than about 7 with a permanent base; then adjusting the pH of the permanent base-adjusted first component to a pH lower than about 4 with a volatile acid; and then admixing an active methylene reactive component.

The first component bearing at least two active methylene-functional groups may be produced by various techniques known in the art. Active methylene-functional oligomers and polymers are preferred. Active methylene-functional groups may be introduced via active methylene-functional chain transfer agents such as, for example, mercaptoalkyl acetoacetates as disclosed in U.S. Pat. No. 4,960,924. Aqueous dispersions of polymer formed from the copolymerization of acetoacetate-functional ethylenically-unsaturated monomers are more preferred. A preferred acetoacetate-functional ethylenically-unsaturated monomer is acetoacetoxyethyl methacrylate which is referred to throughout this specification as AAEM, shown below.

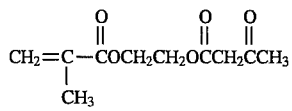

Examples of other monomers useful for introduction of active methylene-functionality are acetoacetoxyethyl acrylate, acetoacetoxypropyl methacrylate, allyl acetoacetate, acetoacetoxybutyl methacrylate, 2,3-di(acetoacetoxy)propyl methacrylate, N-cyanoacetyl-N-methylaminoethyl methacrylate, and the like. A hydroxy functional monomer may be converted to the corresponding acetoacetate by reaction with diketene or other suitable acetoacetylating agent (See e.g. *Comparison of Methods for the Preparation of Acetoacetylated Coating Resins,* Witzeman, J. S.; Dell Nottingham, W.; Del Rector, F. J. Coatings Technology; Vol. 62, 1990, 101 (and references contained therein)).

Active methylene-functional polymers which may be used in the method of this invention may be copolymers of an active methylene-functional monomer and at least one other ethylenically-unsaturated monomer. Suitable comonomers are olefins such as, for example, ethylene and isoprene; alkyl (meth)acrylates where the alkyl group has 1 to 20 carbon atoms (more preferably 1 to 8 carbon atoms); vinyl acetate; acrylic acid; methacrylic acid; itaconic acid; acrylonitrile; styrene and substituted styrenes; isobornyl methacrylate; acrylamide, hydroxyethyl (meth)acrylate; hydroxypropyl (meth)acrylate; N-vinyl pyrolidinone; butadiene; and vinyl halides such as, for example, vinyl chloride and vinylidene chloride. Low levels of divinyl or polyvinyl monomers may be used such as, for example, glycol polyacrylates, allyl methacrylate, divinyl benzene, etc. at a level of about 0.01% to 10%, by weight based on the weight of the active methylene-functional polymer.

The active methylene-functional polymer contains at least two active methylene-functional groups; it may contain from about 0.5% to 100% of active methylene-functional monomer, by weight based on the weight of the polymer. Preferably, the active methylene-functional polymer may contain from about 0.5% to about 20% of active methylene-functional monomer, by weight based on the weight of the polymer.

Active methylene-functional polymers having a molecular weight of from about 1000 to greater than ten million may be used. The lower molecular weight polymers should contain a sufficiently high level of acetoacetate to achieve useful cure. For example, a copolymer of AAEM having a molecular weight under 10,000 would typically contain 10% or more of AAEM.

Since a film-forming active methylene-functional polymer is preferred, preferred active methylene-functional emulsion polymers will generally have a glass transition temperature (Tg) lower than about 60° C. since such polymers, with sufficient coalescent, will form good quality films at ambient temperatures. If soluble active methylene-functional polymers are used, polymers of higher Tg may be used since they are film-forming directly on solvent evaporation.

Aqueous emulsion polymerization may be used to form the active methylene-functional polymer. Conventional surfactants may be used in the emulsion polymerization such as, for example, anionic and/or nonionic emulsifiers such as, for example, alkali or ammonium alkyl sulfates, alkyl sulfonic acids, fatty acids, and oxyethylated alkyl phenols. The amount of surfactant used is usually about 0.1 to about 6% by weight, based on the weight of total monomer. Either thermal or redox initiation processes may be used. Conventional free radical initiators such as, for example, hydrogen peroxide, t-butyl hydroperoxide, ammonium and/or alkali persulfates may be used; typically about 0.05 to about 3.0% by weight based on the weight of total monomer is used. Redox systems using the same initiators coupled with a suitable reductant such as, for example, sodium bisulfite may be used at similar levels. A chain transfer agent such as, for example, n-octyl mercaptan, n-dodecyl mercaptan, butyl or methyl mercaptopropionate and mercaptopropionic acid at a level of about 0.05 to about 6% by weight based on total weight of monomer may be used.

The invention may also be practiced using a water-miscible solvent-soluble or water-soluble polymer bearing at least two active methylene-functional groups. When this is desired, the polymer may be prepared directly in water if the monomer(s) is water soluble or, alternatively, the polymerization medium may be a water-miscible solvent such as, for example, isopropanol, butyl cellosolve, propylene glycol, mixtures thereof, and mixtures thereof with water. Water may be included in the polymerization mixture or post-added after the polymerization is complete.

In another embodiment of this invention, an aqueous dispersion containing copolymer particles made up of at least two mutually incompatible copolymers may be used. These mutually incompatible copolymers may be present in the following morphological configurations, for example, core/shell, core/shell particles with shell phases incompletely encapsulating the core, core/shell particles with a multiplicity of cores, interpenetrating network particles, and the like. In all of these cases, the majority of the surface area of the particle will be occupied by at least one outer phase and the interior of the particle will be occupied by at least one inner phase. It is preferred that the polymer in the outer phase bears at least two active methylene-functional groups. The mutual incompatibility of the two polymer compositions may be determined in various ways known in the art. Scanning electron microscopy using staining techniques to accentuate the difference between the phases, for example, is such a technique.

The first component bearing at least two active methylene-functional groups will be formed at a pH determined by the ingredients used in its preparation. Typically, carboxylic acid containing monomers may be incorporated, which will result in a pH lower than about 4.

The pH of the first component is then adjusted with permanent base to a pH sufficiently high that substantial reaction of the active methylene-functional component and the active methylene-reactive component, which will be added subsequently in the method of this invention, will occur when subjected to the desired curing conditions. Preferred is a pH higher than about 7. By "permanent base" herein is meant a base which is substantially nonvolatile under storage, application, and curing conditions. Preferred permanent bases are sodium hydroxide, potassium hydroxide, lithium hydroxide, calcium hydroxide, disodium phosphate, amines with boiling points higher than the desired storage, application, and curing temperature such as, for example, dimethylamino ethanol, and quaternary ammonium hydroxides.

The pH of the permanent base-adjusted first component is then adjusted with volatile acid to a pH sufficiently low that substantial reaction of the active methylene-functional component and the active methylene-reactive component, which will be added subsequently in the method of this invention, will not occur under the desired time/temperature storage conditions. Preferred is a pH lower than about 4. By "volatile acid" herein is meant an acid which is substantially volatile under the desired curing conditions, that is, substantially all the added volatile acid will volatilize under the desired curing conditions. Preferred as volatile acid is acetic acid.

An active methylene-reactive component is then admixed with the pH-adjusted first component at a pH lower than about 4, using conventional mixing techniques. The active methylene-reactive component may be prepared by various techniques known in the art. Preferred active methylene-reactive components are aldehydes, oligomers bearing aldehyde groups, or polymers bearing aldehyde groups. More preferred are formaldehyde and octanal.

The ratio of the number of equivalents of active methylene-functionality to the number of equivalents of active methylene-reactive functionality may range from about 10:1 to about 1:1 with the preferred ratio being about 2:1.

The stable ambient-curing compositions of this invention may be used as coatings, adhesives, and impregnating agents, for example. The compositions may additionally contain conventional materials such as, for example, pigments, extenders, dispersing agents, surfactants, sequestering agents, coalescing agents, defoaming agents, humectants, thickeners, defoamers, colorants, waxes, bactericides, fungicides, odor-modifying agents, and other resinous materials.

The compositions of this invention may be applied to a wide variety of materials such as, for example, wood, cement or concrete, nonwoven or woven fabrics, aluminum or other metals, glass, ceramics, glazed or unglazed tiles, polyvinyl chloride and other plastics, plaster, stucco, and roofing substrates such as asphaltic coatings, roofing felts, synthetic polymer membranes, and foamed polyurethane insulation; or to previously painted, primed, undercoated, worn, or weathered substrates.

The compositions of this invention may be applied by techniques well known in the art such as by paint brush, roller, air-assisted spray, airless spray, direct roll coater, curtain coater, trowels, and the like.

The following Examples are provided to further illustrate aspects of the invention; they should not be read as limiting the scope of the invention. All quantities expressed as percents are percent by weight unless otherwise specified.

EXAMPLE 1

Preparation of a Stable Ambient-Curing Composition

Sample 1, an active methylene-functional component containing 52 parts butyl acrylate, 43.5 parts methyl methacrylate, 5.0 parts AAEM, and 1.5 parts methacrylic acid was prepared by conventional free radical-initiated emulsion polymerization, incorporating 0.2 parts n-dodecyl mercaptan in the polymerization process. Sample 1 had pH=ca. 2.5. The polymer was neutralized to pH=7.5 with a 5% solution of disodium phosphate in water. Then glacial acetic acid was added to adjust the pH to 3.7. Then, an active methylene-reactive component, an aldehyde as identified in Table 1.1 below, was added in an amount of 0.5 moles of aldehyde per mole of AAEM. The water-insoluble aldehyde, octanal, was added as an emulsion in water, which emulsion was prepared by mixing 15 parts of octanal, 10 parts nonionic surfactant (TRITON X-405; 70%), and 100 parts of water.

The ambient-curing compositions were tested for stability at room temperature (RT) and at 60 C. They were then dissolved in tetrahydrofuran at a level of 1% solids and centrifuged at 50,000 rpm. for 2 hours and 40 minutes in order to substantially separate solvent-soluble polymer from solvent-insoluble poplymer, or gel. The soluble fraction is the fraction of the weight of the total solids which is THF-soluble. A decrease in soluble fraction is taken to mean that crosslinling is occurring, that is, that the ambient-curing binder composition is not stable. The stability data is presented in Table 1.1.

TABLE 1.1

| | Stability of ambient-curing compositions | | |
|---|---|---|---|
| Aldehyde | Initial Soluble Fraction | 18 days/RT Soluble Fraction | 18 days/60° C. Soluble Fraction |
| None | .96 | .96 | .96 |
| Formaldehyde | .96 | .96 | .42 |
| Octanal | .96 | .95 | .95 |
| Glyoxylic acid | .96 | .96 | .95 |

The ambient-curing compositions prepared by the method of this invention all exibit excellent stability with the exception of formaldehyde which undergoes some reaction under the more severe 60 C. conditions.

SAMPLE 2

Evaluation of Curing of Stable Ambient-Curing Composition

The ambient-curing compositions of Example 1 were drawn down on glass lantern slides using, alternatively, a 5 mil or a 10 mil drawdown bar. The films were allowed to air dry and were tested for solvent resistance using MEK double rubs (one double rub is one up and down motion of a finger bearing down on the MEK-wet polymer film; the number of double rubs which cause the film to be removed (eroded) to the substrate are reported) after 3, 10, and 14 days ambient curing. The higher the number of rubs, the more highly cured the film. The results are presented in Table 2.1.

TABLE 2.1

| | Curing of ambient-curing compositions | | | |
|---|---|---|---|---|
| | | MEK Double Rubs after | | |
| Aldehyde | Mils | 3 days/RT | 10 days/RT | 14 days/RT |
| None | 5 | 3 | 3 | 3 |
| None | 10 | 10 | 5 | 5 |
| Formaldehyde | 5 | 14 | 18 | 18 |
| Formaldehyde | 10 | 50 | 50 | 50 |
| Octanal | 5 | 20 | 24 | 30 |
| Octanal | 10 | 50 | 50 | 55 |
| Glyoxylic acid | 5 | 5 | 40 | 110 |
| Glyoxylic acid | 10 | 10 | 68 | 280 |

The ambient-curing compositions prepared by the method of this invention all exibit curing under ambient conditions.

EXAMPLE 3

Stable Ambient-Curing Compositions Incorporating Higher Levels of AAEM

Sample 2(52 BN38.5 MMN10 AAEM/1.5 MAA//0.2 n-DDM) and Sample 3(52 BA/33.5 MMA/20 AAEM/1.5 MAN/0.2 n-DDM) were prepared and evaluated for curing according to Examples 1 and 2. The results are presented in Table 3.1.

TABLE 3.1

| | Curing of stable ambient-curing compositions | | | |
|---|---|---|---|---|
| | | MEK Double Rubs after RT cure | | |
| Sample | Aldehyde | Mils | 3 days | 10 days | 14 days |
| 2 | Octadial | 5 | 7 | 20 | 20 |
| 2 | Octadial | 10 | 50 | 50 | 50 |
| 2 | Octadial | 20 | 194 | 200 | 300 |
| 2 | Glyoxylic acid | 5 | 6 | 10 | 50 |
| 2 | Glyoxylic acid | 10 | 12 | 20 | 130 |
| 2 | Glyoxylic acid | 20 | 16 | 35 | >300 |
| 3 | Octadial | 5 | 15 | 17 | 25 |
| 3 | Octadial | 10 | 40 | 67 | 87 |
| 3 | Octadial | 20 | 240 | 267 | 300 |
| 3 | Glyoxylic acid | 5 | 8 | 20 | 50 |
| 3 | Glyoxylic acid | 10 | 14 | 20 | 130 |
| 3 | Glyoxylic acid | 20 | 20 | 40 | 220 |

The ambient-curing compositions prepared by the method of this invention all exhibit curing under ambient conditions.

I claim:

1. A method for preparing a stable ambient-curing composition comprising:
   (a) forming an aqueous emulsion-polymerized polymer comprising from about 0.5% to 100%, by weight based on the weight of said polymer, of at least one copolymerized monomer selected from the group consisting of acetoacetoxyethyl methacrylate, acetoacetoxyethyl acrylate, acetoacetoxypropyl methacrylate, allyl acetoacetate, acetoacetoxybutyl methacrylate, 2,3-di(acetoacetoxy)propyl methacrylate, and N-cyanoacetyl-N-methylaminoethyl methacrylate, said polymer having a molecular weight higher than about 1000;
   (b) adjusting the pH of said polymer to a pH higher than about 7 with a base, said base being substantially non-volatile under storage, application, and curing conditions;
   (c) adjusting the pH of said base-adjusted polymer to a pH lower than about 4 with an acid, said acid being substantially volatile under curing conditions; and,
   (d) admixing an aldehyde, wherein the ratio of the number of equivalents of active methylene functionality in said copolymerized monomer to the number of equivalents of aldehyde is from about 10 to 1 to about 1 to 1.

2. The method of claim 1 wherein said monomer is acetoacetoxyethyl methacrylate at a level from about 0.5% to about 20%, by weight based on the weight of said polymer.

3. The method of claim 1 wherein said base is selected from the group consisting of sodium hydroxide, potassium hydroxide, lithium hydroxide, calcium hydroxide, disodium phosphate, dimethylaminoethanol, and quaternary ammonium hydroxides.

4. The method of claim 1 wherein said volatile acid is acetic acid.

5. The method of claim 1 wherein said aldehyde is selected from the group consisting of formaldehyde and octanal.

6. An article comprising the composition of claim 1.

* * * * *